April 7, 1925.

J. C. TURNER 1,532,963

FLYWHEEL AND PINION CONSTRUCTION FOR TOYS

Filed May 5, 1924

INVENTOR,
John C. Turner,
BY
Howard S. Smith,
His ATTORNEY

Patented Apr. 7, 1925.

1,532,963

UNITED STATES PATENT OFFICE.

JOHN C. TURNER, OF DAYTON, OHIO.

FLYWHEEL AND PINION CONSTRUCTION FOR TOYS.

Application filed May 3, 1924. Serial No. 710,947.

*To all whom it may concern:*

Be it known that I, JOHN C. TURNER, a citizen of the United States, residing at Dayton, in the county of Montgomery and State of Ohio, have invented certain new and useful Improvements in a Flywheel and Pinion Construction for Toys, of which the following is a specification.

This invention relates to new and useful improvements in a fly wheel and pinion construction, and has particular reference to a fly wheel and pinion of the laminated type for use in toys.

One of the principal objects of my invention is to provide for toys, a laminated fly wheel and pinion construction which may be economically manufactured, and which is easily assembled and positively mounted on the spindle. The laminations forming the pinion are stamped out of a suitable strip of metal, and are so mounted on the spindle that the lubricant may easily work between them. On the same spindle the fly wheel discs are also mounted, face to face, to provide a fly wheel which has a true balance and a positive mounting on it.

Other important and incidental objects will be brought out in the following specification, and particularly set forth in the subjoined claims.

Figure 1:
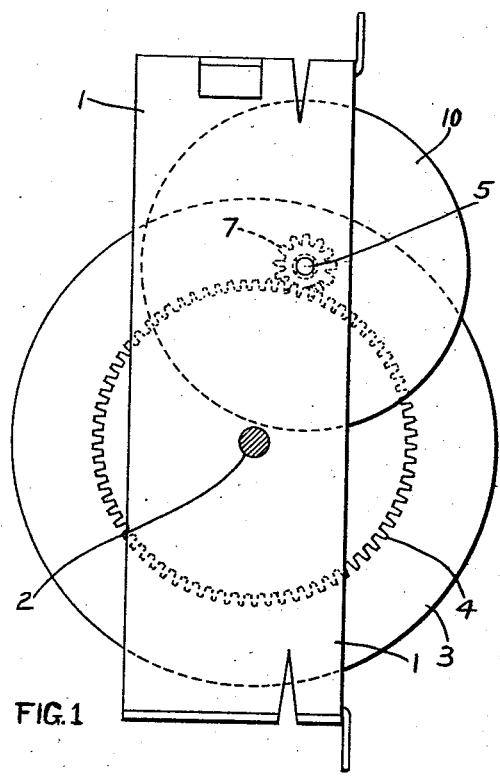
Figure 2:
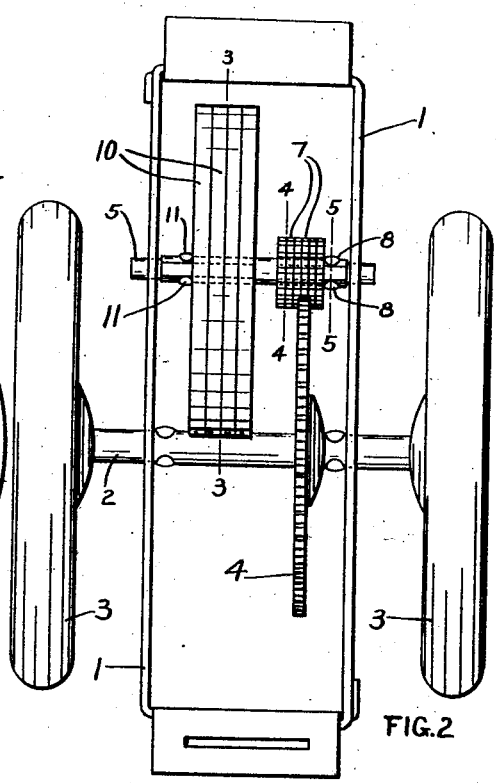
Figure 3:
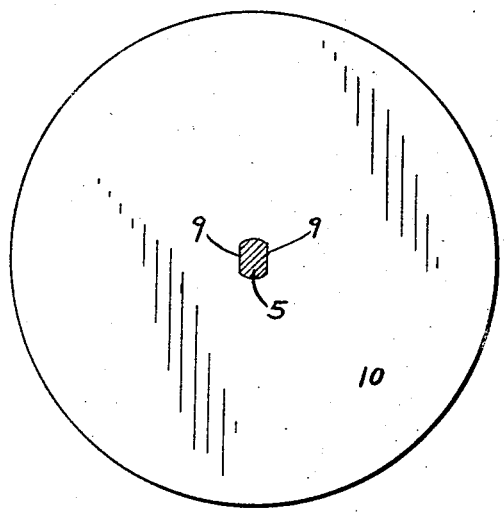
Figure 4:
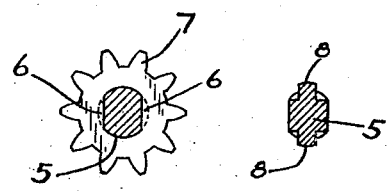
Figure 5:
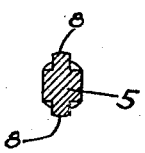

In the accompanying drawings, Figure 1 is a side elevational view of my toy motor, with the wheel on the near side removed to show my laminated pinion construction. Figure 2 is a plan view of the motor, showing the laminated pinion and fly wheel mounted on the spindle. Figure 3 is a sectional view taken through the fly wheel on the line 3—3 of Figure 2. Figure 4 is a sectional view on the line 4—4 of Figure 2, showing one of the pinion discs mounted on a flat milled portion of the spindle. And Figure 5 is a sectional view taken on the line 5—5 of Figure 2, showing how the metal on the sides of the spindle is upset by staking to hold the fly wheel and pinion in position on it.

Referring to the accompanying drawings for a detailed description of my invention, the numeral 1 designates a sub-frame in which is journaled an axle shaft 2 on which are fast ground wheels 3, 3. Fast on the axle shaft 2 within the sub-frame 1, is a gear 4 that is adapted to be driven by improved pinion and fly wheel construction now to be described.

Journaled within the sub-frame 1 a short distance from the axle-shaft 2, is a spindle 5. On its end opposite the gear 4, two sides 6, 6 of the spindle are milled flat for a certain portion of its length to receive a series of thin toothed-stampings 7, each one of which has a squared central hole that is adapted to fit the flat part of the spindle for a positive mounting thereon. These stampings are economically made, and when they are mounted on the spindle they form a pinion which engages the gear 4 to rotate the latter when the spindle is turned. (See Figures 2 and 4.)

After the pinion stampings 7 are fitted on the flat portion of the spindle 5, burs or upset portions 8 are formed on it to engage the outside one of the stampings to hold them on the spindle. The inward movement of the stampings is limited by the shoulders which are formed at the inner ends of the flat surfaces on the spindle. Between this shoulder and the burs 8, the stampings 6 are so mounted on the spindle as to form a sturdy and positively driven pinion between whose laminations graphite or any other lubricant may freely work at all times.

A short distance from its pinion receiving part, the spindle 5 has two flat milled sides 9, 9 to form for a short portion of its length a flattened part adapted to receive a series of punchings 10 that have squared central holes adapted to fit this flattened part of the spindle for a positive mounting thereon. These punchings 10 are of disc form, as shown in Figures 1, 2 and 3, and when mounted face to face on the flattened part of the spindle defined by its sides 9, 9, they form together a balanced fly wheel in which energy is stored for propelling the toy through the pinion, gear and axle means above described. Formed on the spindle in a position to engage the outermost punching 10, are burs or upsets 11. (See Figures 2 and 5.) These upsets and the shoulders that are formed at the inner ends of the flat spaces 9 on the spindle, solidly hold the discs 10 between them to provide a fly wheel which is economically made for efficient service.

It will thus be seen that I have provided for toys, or for any other desired use, a fly wheel and pinion construction that may be cheaply made, easily assembled and efficiently operated.

Having described my invention, I claim:

1. In a device of the type described, the combination with a spindle, of a series of toothed-disc stampings having squared central holes, said spindle being formed with a flattened portion upon which said stampings are fitted, face to face, to form a pinion, a gear in engagement with said pinion, and means formed on the spindle to hold said stampings closely together for a firm mesh with said gear.

2. In a device of the type described, the combination with a spindle having a flattened portion, of a series of toothed-disc stampings having squared central holes, fitted, face to face, on said flattened portion of the spindle to form a pinion, a gear in engagement with the latter, and burs formed on the spindle to engage the outer one of said stampings after the latter are mounted on the flattened portion of said spindle.

3. A device of the type described comprising a spindle flattened at one end, a series of toothed stampings with squared holes, fitted on said flattened end of the spindle to form a pinion, and upsets formed on said flattened end beyond the stampings to hold them against the shoulder at the inner end of its flattened portion.

In testimony whereof I have hereunto set my hand this 25th day of April, 1924.

JOHN C. TURNER.

Witness:
HOWARD S. SMITH.